(12) United States Patent
Byrd et al.

(10) Patent No.: US 7,854,788 B2
(45) Date of Patent: Dec. 21, 2010

(54) FILTER MEMBRANE

(75) Inventors: Norman R. Byrd, Villa Park, CA (US); James P. Huang, Huntington Beach, CA (US); Gwen Gross, Redmond, WA (US)

(73) Assignee: The Boeing Company, Chicago, IL (US)

( * ) Notice: Subject to any disclaimer, the term of this patent is extended or adjusted under 35 U.S.C. 154(b) by 678 days.

(21) Appl. No.: 11/758,838

(22) Filed: Jun. 6, 2007

(65) Prior Publication Data

US 2008/0302243 A1    Dec. 11, 2008

(51) Int. Cl.
*B01D 53/22* (2006.01)
(52) U.S. Cl. .................. 95/45; 95/50; 95/148; 95/278; 95/285; 95/903; 96/4; 96/11; 96/143; 96/223; 96/226; 55/486; 55/487; 55/524; 55/527; 55/DIG. 5; 205/50; 205/161; 205/209; 205/224; 264/44; 264/45.1; 977/900; 977/903
(58) Field of Classification Search .................. 55/486, 55/487, 522, 524, 527, DIG. 5, DIG. 35; 96/4, 11, 108, 143, 223, 226; 95/45, 50, 95/54, 90, 148, 285, 901, 903, 278; 205/50, 205/159, 161, 205, 209, 224; 264/44, 45.1; 977/900, 903

See application file for complete search history.

(56) References Cited

U.S. PATENT DOCUMENTS

| | | | | |
|---|---|---|---|---|
| 4,444,574 | A  * | 4/1984 | Tradewell et al. | 55/524 |
| 5,827,355 | A  * | 10/1998 | Wilson et al. | 95/114 |
| 6,471,745 | B1 * | 10/2002 | Foley et al. | 96/11 |
| 6,702,875 | B2 * | 3/2004 | Jagtoyen et al. | 95/90 |
| 6,969,029 | B2 | 11/2005 | Crouch et al. | |
| 7,014,681 | B2 * | 3/2006 | Noack et al. | 96/11 |
| 7,195,701 | B2 | 3/2007 | Byrd et al. | |
| 7,404,844 | B2 * | 7/2008 | Tin et al. | 95/45 |
| 2005/0161337 | A1* | 7/2005 | Byrd et al. | 205/159 |
| 2008/0053831 | A1* | 3/2008 | Byrd et al. | 205/50 |

OTHER PUBLICATIONS

R. Suoboda, A.J. Gutz. B. Ngo, C. Johnson, Jr.—http://www.cem.msu.edu, 2009.
http://www.wonderquest.com.
http://en.wikipedia.org/wiki/Molecular_geometry.

* cited by examiner

*Primary Examiner*—Jason M Greene
(74) *Attorney, Agent, or Firm*—Tung & Associates

(57) ABSTRACT

A filter membrane includes a substrate, a polymer layer provided on the substrate and a plurality of filter openings each having a width of from about 2 nanometers to about 5 nanometers provided in the polymer layer. A method of controlling pore size of a filter membrane and a method of decontaminating a filter membrane are also disclosed.

16 Claims, 3 Drawing Sheets

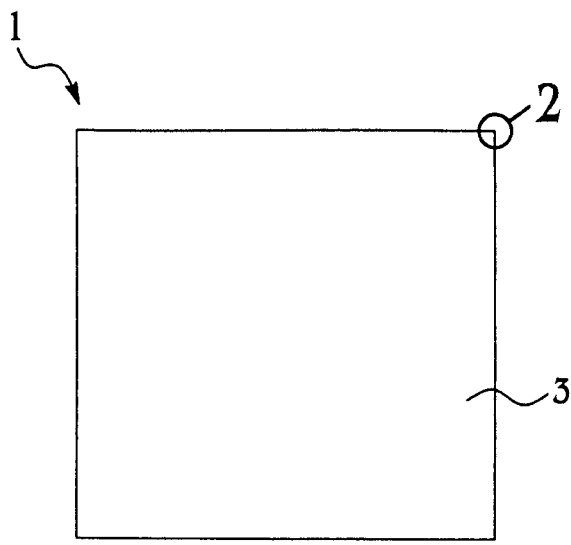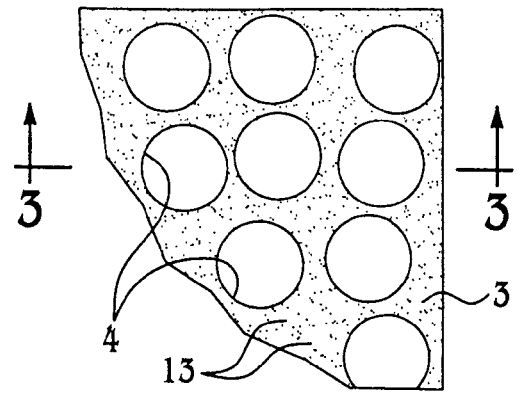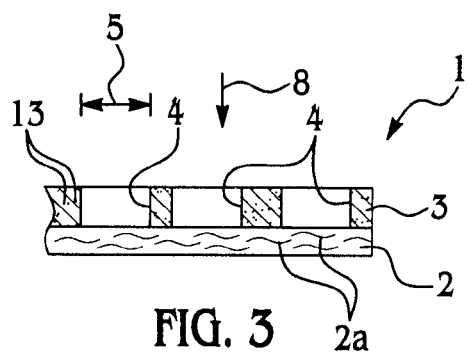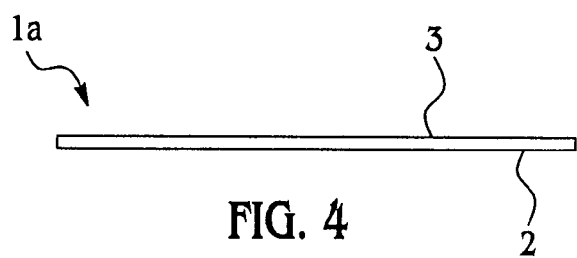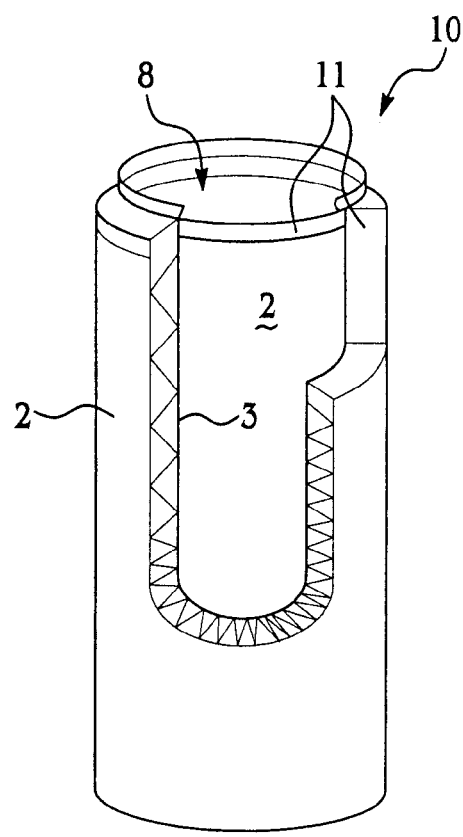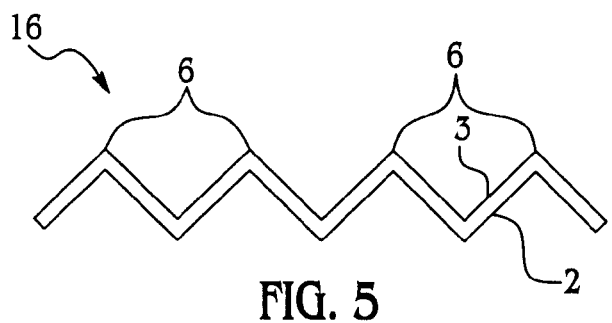

(A) CARBOXYMETHYLCELLULOSE (B) POLYYANIC ACID

FILTER MEMBRANE

FIELD

Figure 7:
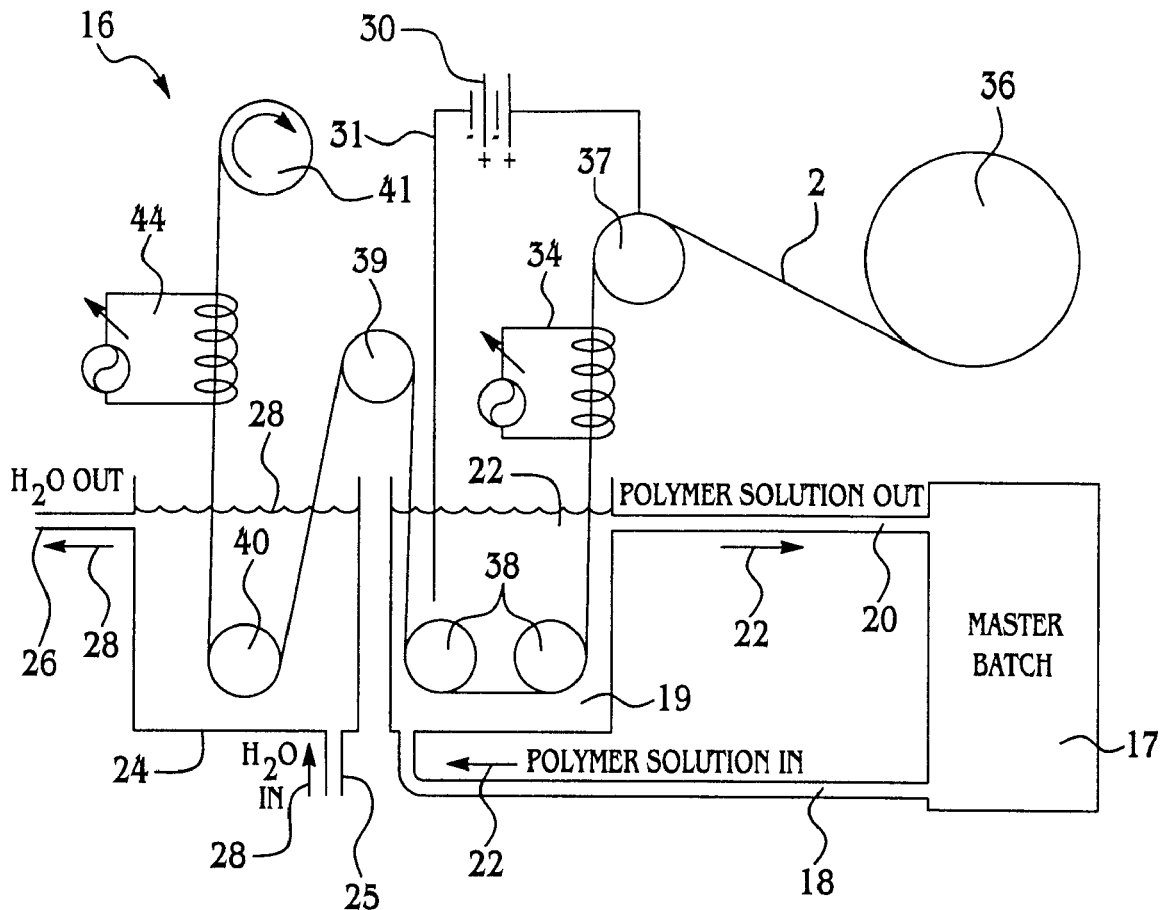

The present disclosure relates to filter membranes. More particularly, the present disclosure relates to a filter membrane having nanoscale pores for filtering viruses, bacteria and nanoscale particles.

BACKGROUND

In the category of airborne contaminants, viruses and bacteria are the most prevalent and potentially dangerous. Viruses range in size from about 20 to about 250 nanometers. Some of the most infectious viruses include the human flu virus, the avian flu virus (bird flu), rhinitis (the common cold) and SARS (severe acute respiratory syndrome). In many instances, human contact with viruses results in severe illness and sometimes, death. Bacteria, on the other hand, average about 1000 nanometers. Harmful bacteria include anthrax, which is a potential agent in biological warfare. Airborne particles such as pollen are common causes of allergic reactions such as hay fever.

A filter membrane is needed which has a controlled porosity in the low nanometer range, is amenable to any geometrical shape and can be used as a face mask or building filter, for example, for potentially biologically-infectious agents and pollutants.

SUMMARY

The present disclosure is generally directed to a filter membrane. An illustrative embodiment of the filter membrane includes a substrate, a polymer layer provided on the substrate and a plurality of filter openings each having a width of from about 2 nanometers to about 5 nanometers provided in the polymer layer. The invention is further generally directed to a method of controlling pore size of a filter membrane and a method of decontaminating a filter membrane.

BRIEF DESCRIPTION OF THE DRAWINGS

The invention will now be described, by way of example, with reference to the accompanying drawings, in which:

FIG. 1 is a top view of an illustrative embodiment of the filter membrane, configured in a generally rectangular shape.

FIG. 2 is an enlarged sectional view, taken along section line 2 in FIG. 1, illustrating multiple nanopores in the filter membrane.

FIG. 3 is a cross-sectional view, taken along section lines 3-3 in FIG. 2.

FIG. 4 is an edge view of a planar filter membrane.

FIG. 5 is an edge view of a pleated filter membrane.

FIG. 6 is a perspective view, partially in section, of a cylindrical air filter cartridge which incorporates one or multiple filter membranes.

FIG. 7 is a schematic diagram illustrating an electrodeposition apparatus and process for fabrication of an illustrative embodiment of the filter membrane.

FIG. 8 is a flow diagram which illustrates an illustrative embodiment of a process for fabricating a filter membrane.

FIG. 9 is a schematic diagram which illustrates representative polymers suitable for electrodeposition in the fabrication of the filter membrane.

FIG. 10 is a schematic diagram which illustrates a typical chemical reaction in the bonding of a polymer layer to a substrate during fabrication of the filter membrane.

DETAILED DESCRIPTION

Referring initially to FIGS. 1-6 of the drawings, an illustrative embodiment of the filter membrane is generally indicated by reference numeral 1. The filter membrane 1 includes a substrate 2. In some embodiments, the substrate 2 is a carbon fiber substrate such as a carbon fiber cloth, for example. As shown in the cross-sectional view of FIG. 3, in embodiments in which the substrate 2 is a carbon fiber substrate, multiple carbon fibers **2*a* are randomly distributed in perpendicular relationship with respect to an air flow pathway 8 through the filter membrane 1, as will be hereinafter described. The carbon fibers 2*a* range in size from less than typically about 1 μm to greater than typically about 50 μm in diameter. Packing density of the carbon fibers 2*a* in the substrate 2 ranges from typically about 1% to about 30%. The carbon fibers 2*a*** may be made from cotton, rayon, polyacrylonitrile, polyester, polypropylene or any of a variety of alternative materials.

As further shown in FIG. 3, a polymer layer 3 is provided on the substrate 2. In some embodiments, the polymer layer 3 is electrodeposited on the substrate 2 such as in a manner which will be hereinafter described. The polymer layer 3 may be any organic or inorganic polymer having reactive groups which are available for the deposition process. Polymers which are suitable for the polymer layer 3 include, without limitation, polyimide; carboxymethyl cellulose; polyamic acid (polyimide precursor); polyphenol; polystyrene sulfonic acid; polyacrylic acid; polymethacrylic acid; polythiophenol; and polyacrylic acid/butadiene copolymer, among others. As shown in FIGS. 2 and 3, in some embodiments a selected quantity of nanosilver 13 is provided in the polymer layer 3 to impart anti-microbial properties to the filter membrane 1.

As shown in FIGS. 2 and 3, multiple pores or filter openings 4 extend through the polymer layer 3 of the filter membrane 1. The filter openings 4 may be arranged in a random distribution or a non-random distribution throughout the polymer layer 3. In some embodiments, the filter openings 4 are formed in the polymer layer 3 using a pyrolysis process, which will be hereinafter described. As shown in FIG. 3, each filter opening 4 has a filter opening width 5 which ranges from typically about 2 nm to about 5 nm.

It will be appreciated by those skilled in the art that the filter membrane 1 can be formed in any of a variety of shapes and configurations depending on the desired application of the filter membrane 1. As shown in FIG. 4, in some applications the filter membrane **1*a* has a flat panel or planar configuration. One or multiple filter membranes 1*a* can be used to filter airborne biological agents such as viruses and bacteria, as well as airborne allergens such as pollen, for example. A typical airflow pathway 8 through the filter membrane 1*a* is shown in FIG. 3. Viruses which are present in the airflow pathway 8 have a size of typically from about 25 nm to about 250 nm. Bacteria which are present in the airflow pathway 8 have an average size of typically about 1000 nm. Accordingly, these airborne biological agents are incapable of flowing through the filter openings 4 in the polymer layer 3, and therefore, do not emerge from the substrate 2 side of the filter membrane 1. One or multiple ones of the filter membrane 1** can be incorporated into a face mask (not shown) which can be worn by rescue personnel and the like in the event of a biological terrorism attack, for example, to prevent entry of biological agents into the nose and mouth. After use, the filter membrane 1 can be decontaminated by running an electrical current having a voltage of typically about 3-150 volts across the filter membrane 1 for a time period of typically about 10-60 seconds.

As shown in FIG. 5, in some applications the filter membrane 1b has a pleated configuration, with multiple folds or pleats 6 formed in the substrate 2 and polymer layer 3. The pleats 6 may extend in the longitudinal dimension or the transverse dimension of the filter membrane 1b. The pleats 6 enhance the airborne biological agent and particle collection efficiency of the filter membrane 1b.

As shown in FIG. 6, in still other applications one or multiple filter membranes 1 can be arranged in one or multiple filter layers 11 which are disposed in a generally cylindrical shape to form an air filter cartridge 10. The airflow pathway 8 extends through the air filter cartridge 10. The polymer layer 3 side of each filter membrane 10 is typically disposed closest to the airflow pathway 8. Accordingly, airborne biological agents and particles which are present in the air flow pathway 8 are trapped by the filter openings 4 (FIG. 3) in each filter membrane 1 which forms the single or multiple filter layers 11 of the air flow cartridge 10.

Referring next to FIG. 7 of the drawings, an electrodeposition system 16 which is suitable for electrodeposition of the polymer layer 3 on the substrate 2 (FIG. 3) of the filter membrane 1 is shown. The electrodeposition system 16 includes a master batch container 17 which is adapted to contain a supply of electrodeposition solution 22. A solution outlet conduit 18 and a solution inlet conduit 20 are disposed in fluid communication with the master batch container 17. The solution outlet conduit 18 and the solution inlet conduit 20 are further disposed in fluid communication with an electrodeposition container 19. A pump (not shown) is adapted to circulate the electrodeposition solution 22 from the master batch container 17, through the solution outlet conduit 18 to the electrodeposition container 19 and back to the master batch container 17 through the solution inlet conduit 20.

A water container 24 is typically adjacent to the electrodeposition container 19. A water inlet conduit 25 and a water outlet conduit 26 communicate with the water container 24. A pump (not shown) is adapted to pump water 28 into the water container 24 through the water inlet conduit 25 and from the water container 24 through the water outlet conduit 26.

The electrodeposition system 16 includes an electrical supply 30 which is typically a variable volt DC supply. A cathode 31 is connected to the negative terminal of the electrical supply 30 and extends into the electrodeposition solution 22 in the electrodeposition container 19. An anode pulley 37, the purpose of which will be hereinafter described, is connected to the positive terminal of the electrical supply 31. In some embodiments, the anode pulley 37 is graphite.

A substrate supply spool 36, on which is wound a supply of the substrate 2, is disposed in spaced-apart relationship with respect to the anode pulley 37. A pair of adjacent deposition container pulleys 38 is provided in the electrodeposition container 19, generally beneath the anode pulley 37. A guide pulley 39 is provided generally above and between the electrodeposition container 19 and the water container 24. A water container pulley 40 is provided in the water container 24. A collecting spool 41 is provided typically above the water container pulley 40. In some embodiments, an activation heater 34 is provided between the anode pulley 37 and the deposition container pulleys 38 to activate the substrate 2. In some embodiments, a curing or drying heater 44 is provided between the water container pulley 40 and the collecting spool 41.

In typical use of the electrodeposition system 16 to deposit the polymer layer 3 on the substrate 2 (FIG. 3), a continuous band or ribbon of the substrate 2 is wound on the substrate supply spool 36 and trained around the anode pulley 37, the deposition container pulleys 38, the guide pulley 39 and the water container pulley 40, respectively, and collected on the collecting spool 41. An electrodeposition solution 22 is provided in the master batch container 17. The electrodeposition solution 22 is a solution of the organic or inorganic polymer which will deposit as the polymer layer 3 on the substrate 2. The electrodeposition solution 22 is an aqueous solution which contains any organic or inorganic polymer having reactive groups which are available for the deposition process, including without limitation polyphenolic; polyacrylics (e.g. polyacrylic acid, polymethacrylic acid); carboxy-terminated acrylonitrile/butadiene copolymer; carboxymethyl cellulose; and polyamic acid (precursor to polyimide), among others. The polymer may have a concentration of from about 0.05 moles/liter to about 2 moles/liter in the electrodeposition solution 22. In some embodiments, a selected concentration of nanosilver is provided, as per U.S. Pat. No. 6,979,491 (Dec. 27, 2005), and added to the electrodeposited substrate. The nanosilver has a concentration of from typically about 0.2% to typically about 1.5% with a diameter of between about 1 nm and about 100 nm.

The substrate supply spool 36 and the collecting spool 41 are rotated typically in the clockwise direction shown in FIG. 7 to continually dispense the substrate 2 from the collecting spool 41, along the various pulleys and onto the collecting spool 41, respectively. The electrical supply 30 applies a negative charge to the cathode 31 and a positive charge to the anode spool 37. Accordingly, as the substrate 2 is immersed in the electrodeposition solution and advanced around the deposition container pulleys 38 in the electrodeposition container 19, the cathode 31 is the site of deposition of positive ions, e.g., M+, where M+represents any positively-charged cationic specie, such as Na+, $NH_4$+ and K+, etc. in the electrodeposition solution 22. The polymer in the electrodeposition solution 22 is converted to R* (radical) via elimination of the anion, e.g., anion, COO—, SOO—, O—, and converted into the corresponding gas, e.g., $CO_2$, $SO_2$, $O_2$, etc., which electronically (by electron donation) couples with an electron on the conducting (positively-charged) substrate to become chemically bonded to the substrate, not physically attached. The mechanism for this is related to the Kolbe reaction, where the anion gives up an electron to the anode, splits off as a gaseous by-product and leaves a radical to couple with a free electron (in this case, the carbon anode). Thus, the polymer is coated onto the substrate 2 to form the polymer layer 3 (FIG. 3) on the substrate 2. The heater 34 is available for heating (or activating the carbon fibers, if needed) prior to immersion of the substrate 2 through the electrodeposition solution 22. This, in effect, results in a monomolecular layer being attached to the fibers. Subsequent layers are deposited on the chemically-attached layer via the electric field around the anodic substrate and are held in place by electrostatic forces or hydrogen bonding.

The substrate 2 and polymer layer 3 deposited thereon is advanced from the electrodeposition solution 22, around the guide pulley 39 and into the water container 24, where the substrate 2 and deposited polymer layer 3 are immersed in the water 28. The water 28 removes excess polymer and other impurities from the substrate 2 and polymer layer 3, if desired. Finally, the substrate 2 and deposited polymer layer 3 are advanced from the water container 24 and collected on the collecting spool 41. The curing heater 44 may be operated to cure or dry the polymer layer 3 on the substrate 2.

After the polymer layer 3 is electrodeposited on the substrate 2 and the resulting filter membrane 1 is washed, cured and collected on the collecting spool 41, typically as was heretofore described with respect to FIG. 7, the polymer layer 3 is subjected to a pyrolysis process. The pyrolysis process facilitates control in the filter opening width 5 (FIG. 3) of the pores or filter openings 4 formed in the polymer layer 3. The pyrolysis process is carried out in an inert atmosphere and breaks chemical bonds between gas-forming elements such as nitrogen, hydrogen, oxygen and volatile fragments and the polymers in the polymer layer 3. Since the electrodeposited polymer is either organic (highly carbonaceous) or inorganic (siliconated or phosphorylated), the pyrolysis process, which is carried out in an inert atmosphere, breaks chemical bonds between gas-forming elements such as nitrogen, hydrogen, oxygen, sulfur and other volatile fragments in the polymer layer 3. This results in a nanoporous carbon, silicon (or silicon oxide), silicon carbide or carbophosphorous residue. Thus, the gases and other volatile fragments evolved from the polymer layer 3 form the filter openings 4 in the polymer layer 3. In the pyrolysis process, the polymer layer 3 is subjected to a temperature of from typically about 500° C. to typically about 1050° C., but a preferred temperature of about 800° C. to 900° C. in a nitrogen, argon or helium atmosphere for a time of between two (2) hours to ten (10) hours, preferably six (6) to eight (8) hours. Pyrolysis is performed by ramping the temperature from 300° C. to 800° C. (or 900° C.) and holding at the upper temperature (800° C. or 900° C.) for 6 to 8 hours.

By selecting a polymer which is highly aromatic, such as a polyamic acid (polyimide precursor), for example, the resultant pyrolyzed polymer in the polymer layer 3 has a tendency to form a pseudo-graphitic structure with the porosity of the polymer layer 3 that is attributable to gaseous evolution. Because the gases which evolve from the polymer layer 3 during the pyrolysis process are angstrom-sized, the filter opening width 5 (FIG. 3) of the filter openings 4 which result from their evolution are in the low nanometer range. Evolution of $O_2$ from the polymer layer 3 results in pores of about 0.29 nm. Those figures for $N_2$ and $H_2$ are typically about 0.31 nm and 0.26 nm, respectively. Although pyrolysis results in pores having those dimensions, residual carbon in the substrate 2 expands during heating with some possible chemical rearrangements. The residual pores which result in the filter openings 4 may be somewhat larger but most likely do not exceed the range of about 2~5 nm.

Figure 9:
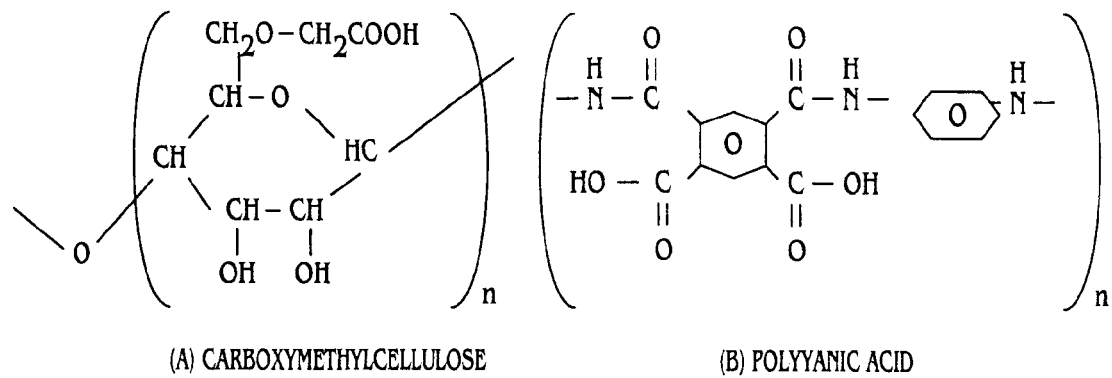
Figure 10:
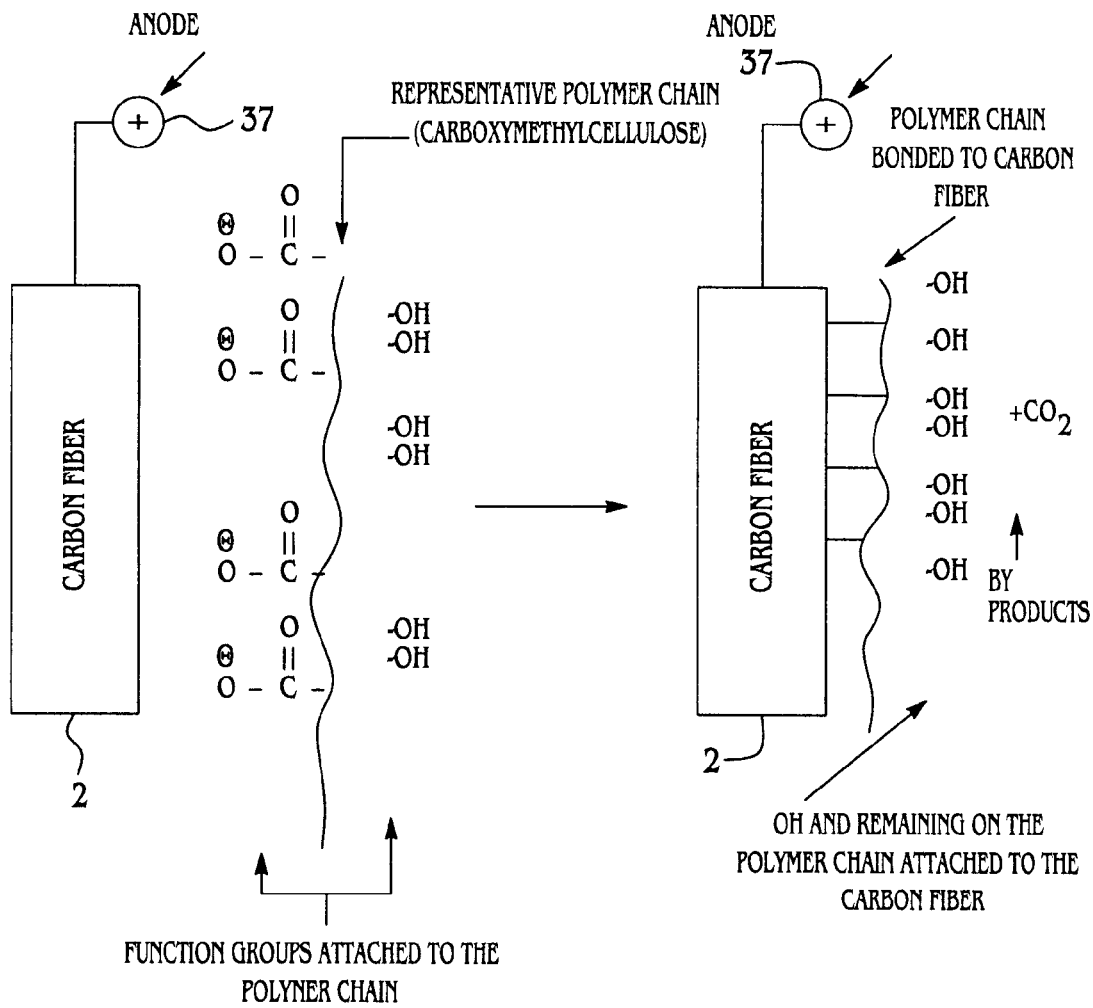

The chemical structures of two representative polymers (carboxymethylcellulose and polyamic acid) which are suitable for the electrodeposition process are shown in FIG. 9. FIG. 10 is a representative example of how the electrodeposited polymer aligns itself with the substrate and how it is chemically bonded to the substrate. In addition to the carboxylate anion (RCOO—) as found in the carboxymethyl cellulose, polyamic acid or other carboxylic acid-containing polymers, anions such as RO— (from phenols); $RSO_2O$— (sulfonic acids); RSOO— (sulfites); RS— (thiophenols); $RPO_3$— (phosphonic acids); $RPO_2$— (phosphinic acids) (attached to a carbon or silicon polymer) may be used in the electrodeposition process.

Figure 8:
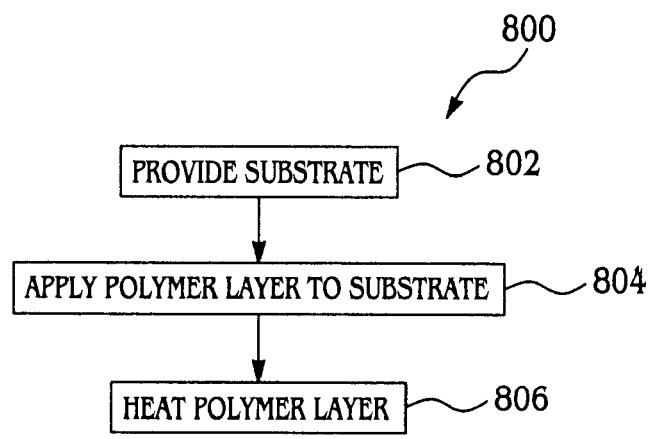

Referring next to FIG. 8, a flow diagram 800 which summarizes a method of controlling the pore size or filter opening of a filter membrane is shown. In block 802, a substrate is provided. In some embodiments, the substrate is a carbon fiber substrate such as a carbon fiber cloth, for example. In block 804, a polymer layer is applied to the substrate. In some embodiments, the polymer layer is applied to the substrate using an electrodeposition process. In block 806, the polymer layer is heated in a pyrolysis process to drive off volatile gases and fragments from the polymer layer and form filter openings in the polymer layer.

Although this invention has been described with respect to certain exemplary embodiments, it is to be understood that the specific embodiments are for purposes of illustration and not limitation, as other variations will occur to those of ordinary skill in the art.

What is claimed is:

1. A filter membrane, comprising:
    a carbon fiber substrate;
    a monolayer of a polymer layer provided on said substrate, said polymer monolayer pyrolyzed; and
    a plurality of filter openings each having a width of from about 2 nanometers to about 5 nanometers provided in said polymer layer.

2. The filter membrane of claim 1 wherein each of said carbon fibers in said carbon fiber substrate has a diameter of about 1 μm to about 50 μm.

3. The filter membrane of claim 1 wherein said polymer layer is organic.

4. The filter membrane of claim 3 wherein said polymer layer comprises carboxymethyl cellulose, polyamic acid (polyimide precursor), polyphenol, polystyrene sulfonic acid, polyacrylic acid, polymethacrylic acid, polythiophenol, carboxyl-terminated acrylonitrile/butadiene copolymer, or polyacrylic acid/butadiene copolymer.

5. The filter membrane of claim 1 further comprising silver provided in said polymer layer.

6. The filter membrane of claim 1 wherein said polymer layer is inorganic.

7. A method of controlling pore size of a filter membrane, comprising:
    providing a carbon fiber substrate;
    applying a polymer layer by electrodeposition to said substrate; and
    forming filter openings in said polymer layer by heating said polymer layer under inert atmosphere and evolving volatile materials from said polymer layer by electrodeposition to pyrolyze said polymer layer, said filter openings having a width of from about 2 nanometers to about 5 nanometers.

8. The method of claim 7 further comprising activating said substrate by heating said substrate prior to said electrodepositing said polymer layer on said substrate.

9. The method of claim 7 further comprising curing said polymer layer by heating said polymer layer after said electrodepositing said polymer layer on said substrate.

10. The method of claim 7 further comprising providing silver in said polymer layer.

11. The method of claim 7 wherein each of said carbon fibers in said carbon fiber substrate has a diameter of about 1 μm to about 50 μm.

12. The method of claim 7 wherein said carbon fibers in said carbon fiber substrate are cotton fibers, polyester fibers or polypropylene fibers.

13. The method of claim 7 wherein said polymer layer comprises carboxymethyl cellulose, polyamic acid (polyimide precursor), polyphenol, polystyrene sulfonic acid, polyacrylic acid, polymethacrylic acid, polythiophenol, carboxyl-terminated acrylonitrile/butadiene copolymer, or polyacrylic acid/butadiene copolymer.

14. A method of decontaminating a filter membrane having nanoscale pores, comprising:
    inducing an electrical current greater than 3 volts across said filter membrane wherein said filter membrane comprises a monolayer of a polymer on a carbon fiber substrate, said polymer layer pyrolyzed, and a plurality of filter openings each having a width of from about 2 nanometers to about 5 nanometers provided in said polymer layer.

15. The method of claim 14, wherein said polymer layer comprises a monolayer of said polymer chemically bonded to said carbon fibers.

16. The method of claim 7, wherein said polymer layer comprises a monolayer of said polymer chemically bonded to said carbon fibers.

* * * * *